March 7, 1967 D. J. TOMAN ET AL 3,308,389
LEAKAGE ELIMINATION CIRCUIT
Filed Feb. 26, 1965
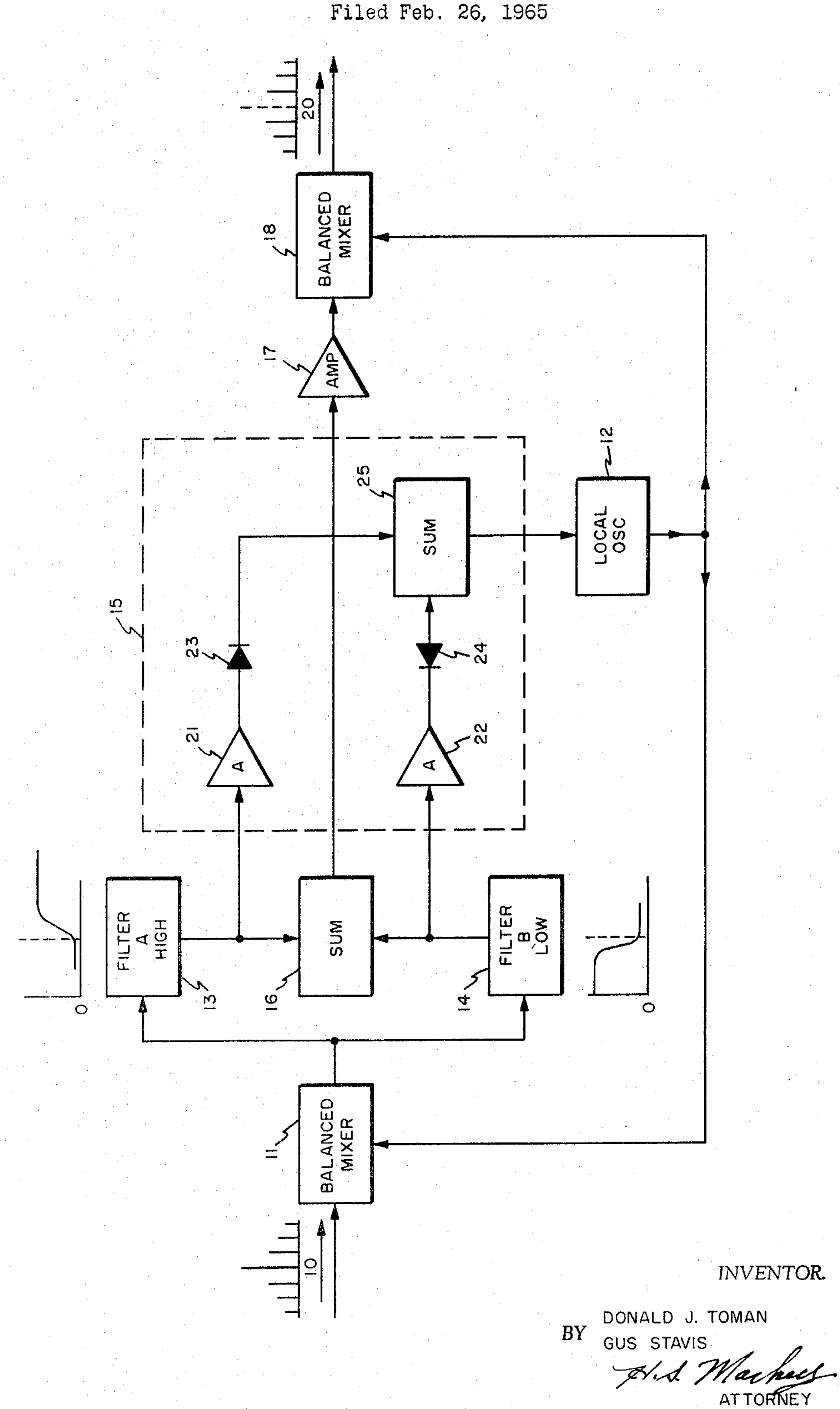
INVENTOR.
BY DONALD J. TOMAN
GUS STAVIS
ATTORNEY

3,308,389
LEAKAGE ELIMINATION CIRCUIT

Donald J. Toman, Pleasantville, and Gus Stavis, Briarcliff Manor, N.Y., assignors to General Precision, Inc., a corporation of Delaware Filed Feb. 26, 1965, Ser. No. 435,666
7 Claims. (Cl. 328—167)

The present invention relates to leakage elimination circuits. A problem exists in frequency modulation (FM) continuous wave (CW) systems whereby the carrier signal or zero order sideband signal of a returned or echo signal saturates the receiver amplifier stage so as to overcome the sideband signals which are that part of the received or echo signal which carry information on the echo signal. This saturation of the amplifier stage (sometimes due to leakage of the transmitter output through accidental couplings) often results in partial or complete loss of the sideband signals and therefore loss of the information contained on the echo signal.

The present invention proposes a novel system in which a returning or echo signal of an FMCW system, which includes the carrier signal and sidebands, is beat down to a convenient, intermeditae frequency and is subjected to a filter controlled closed loop arrangement which rejects the carrier or leakage signal component, which is then at some relatively low frequency (intermediate frequency). The filter arrangement essentially controls a variable frequency local oscillator which in turn controls both reduction of the input signal frequency and increase of the output signal frequency and maintains such control on a wide range of environmental conditions.

The now process includes a novel technique in which a local oscillator, which is essentially controlled by a filter network, is employed to beat down the frequency of an incoming echo signal. The echo signal is reduced in frequency to a low, intermediate frequency (IF) with the characteristics thereon preserved. The low frequency component corresponding to the carrier signal component of the echo signal is attenuated through the use of a filter arrangement having a notched bandpass while the low frequency components corresponding to the sideband components of the echo signal are amplified and rebuilt or returned to the original frequency values.

The notched characteristics in the bandpass of the filter network are detected. When there is a change in the notch characteristics, the component detecting such characteristics provides an output which is varied in value in accordance with such change. This output is applied to the local oscillator as a control signal which causes the local oscillator to change the frequency of its output which is employed to beat down the frequency of the incoming echo signal. Thus, the frequency value of the IF frequency component corresponding to the carrier signal component of the echo signal is maintained within, or follows, the band of the notch in the filter network bandpass in accordance with any change in the notch characteristics.

This operation is accomplished by essentially controlling the local oscillator by the filter network and providing a dual, closed loop arrangement in which the same local oscillator output signal is employed to reduce the incoming signal to a frequency level so that the carrier signal component is attenuated by the filter network and the pure sideband components are preserved. The pure sideband components, at the low frequency level, are rebuilt by employing the same local oscillator output signal which had reduced the frequency level of the input echo signal so that an output of pure sidebands, which duplicates the sideband components of the input or echo signal, is provided, with the carrier signal or leakage signal eliminated.

It is therefore a principal object of the present invention to provide a leakage elimination system which rejects unwanted signals in a complex frequency signal over a wide range of environmental conditions and amplifies the unrejected sideband components.

This and other objects will become apparent from reading the following description of the invention with reference to the accompanying drawing, in which:

The single figure is a block diagram of the present invention.

Considering the block diagram it will be seen that a multifrequency signal 10 (represented graphically), which may include a carrier frequency or signal and sideband components, is applied as an input into a balanced mixer 11. Also applied to the balanced mixer 11 is a signal generated by a local oscillator 12.

The local oscillator 12 is preferably a voltage controlled oscillator which may normally provide an output signal of a predetermined frequency but which may be driven by a voltage, normally referred to as an "error" signal or voltage so as to provide an output signal of new or different frequency, according to the amplitude and polarity of the control or error signal. In addition, the oscillator will hold its output signal at the new frequency when the control signal or error signal is returned to its normal value. The normal value of the control signal or error signal may be zero or a predetermined value.

The balanced mixer 11 provides an output which is equal to the difference of the frequencies applied to the mixer. The frequency of the local oscillator is of such value so that the difference frequency, the output of the mixer is in a range of frequencies normally referred to as intermediate frequencies. The output of the mixer is applied to a filter network represented by two filters 13 and 14.

The filters 13 and 14 are preferably crystal filters individually designed so that one filter, for example, 13, passes a band of frequencies above the IF component corresponding to the carrier signal and the other filter, for example 14, is designed to pass frequencies below the IF component corresponding to the carrier signal. It is preferred that both filters have sharp attenuation characteristics at cutoff. Thus the combination of these two filters provide a broad bandpass having a center rejection notch, such notch substantially including the frequency bandwidth of the IF component coresponding to the carrier signal component of the echo signal. The suggested notch width is 100 cycles, although a narrower or broader notch may be used if desired.

The outputs of the filter combination are applied to a frequency sensitive detector 15 which detects the crossover of the slope of the filters, and the position of the notch between the filter outputs (which is essentially the frequency and width of the notch), and provides an output representing the notch width and frequencies, and is varied in value according to such notch width and frequency band.

One form of frequency sensitive detector is illustrated in broken line block 15. Such device may include a pair of isolation amplifiers 21 and 22 and associated diodes 23 and 24. The isolating amplifiers prevent non-linear loading of the filters by the diodes. They may also provide an amplitude limiting function. The diodes are connected in inverted position with respect to each other. Diode 23 is shown as connected to pass positive components of an alternating current (A.C.) signal and diode 24 is shown as connected to pass negative components of an A.C. signal.

Amplifier 21 receives the output of filter 13 and amplifier 22 receives the output of filter 14.

Although the attenuation characteristics of the filters are considered to be sharp, the bandpass extremes (the lower extreme of the high-pass filter bandpass and the upper extreme of the low-pass filter bandpass) actually slope off and cross-over each other at a low power level. This is represented by the graphic illustrations above filter 13 and below filter 14. These filters may be so selected that the attenuation slope or curve of each is normally equal and opposite so that the cross-over point of the filters is essentially at the same low power level and the output power of the filters are substantially equal.

When the power of the outputs of each filter are substantially equal the diodes 23 and 24 will each provide a direct current (D.C.) output substantially equal in amplitude but opposite polarity, with respect to each other. When these D.C. voltages are summed, as by summing circuit 25, the output of summing circuit 25 may be substantially zero or some predetermined value.

When the IF component corresponding to the carrier signal component of the input signal 10 is of such frequency value so as to be substantially equal to the center frequency of the rejection notch in the bandpass of the filter network, the power of the outputs of the respective filters will be substantially equal.

If the location of the rejection notch in the bandpass should shift, with respect to the frequency value of the IF component corresponding to the carrier signal component of the input signal 10, then the power of the outputs of the respective filters will no longer be equal.

A shift in the location of the rejection notch, with respect to the IF component corresponding to the carrier signal component of the input signal 10, may result from any one or a combination of several things. First, drift of the local oscillator 12, so as to change the frequency of its output applied to the balanced mixer 10, may shift the IF level. Second, drift of either of the filters may shift the rejection notch in the bandpass. Third, a shift in the frequency level of the input signal may cause a shift in the IF level of the balanced mixer. Fourth, a combination of any two or all of these factors may cause the rejection notch to shift with respect to the IF component corresponding to the carrier signal component.

When the power of the outputs of the respective filters are unequal the amplitude of the output of one diode will exceed that of the other. Therefore, when the unequal amplitudes of the opposite polarity signals are summed, as by summing circuit 25, the output of the summing circuit will reflect such condition, and will be representative of the difference in amplitude. This output of the summing circuit serves as a control or error signal which when applied to the local oscillator may drive the oscillator to change the frequency of its output signal in a predetermined direction and amount according to the polarity and amplitude of the error or control signal.

By controlling the frequency of the output of the oscillator, the component of the low frequency signal (output of mixer 11) which corresponds to the carrier component of the input signal may be maintained at a frequency within the rejection band existing between the filters 13 and 14. Thus this low frequency component may be attenuated. With a band between the filters sufficiently wide to attenuate the low frequency component corresponding to the carrier signal component but sufficiently narrow so that the low frequency components corresponding to the sidebands are within the filter bandpass, then the output of the filter network will be the low frequency components corresponding to the sidebands of the input signal without the low frequency component corresponding to the carrier signal component of the input signal. This arrangement essentially isolates and preserves the low frequency components corresponding to the sidebands of the input signal, at the outputs of the filter network.

The outputs of the filters 13 and 14 are summed, such as by summing circuit 16 and the summed signal is amplified by amplifier 17. The amplified output is applied to a second balanced mixer 18 which also receives the output of the local oscillator 12 as an input. The balanced mixer 18 rebuilds the output of the amplifier 17 to the frequency of the original input signal 10. However, the carrier signal component has been eliminated by the filter network and the output 20 of the mixer 18 is a signal which duplicates the sideband components of the input signal 10, with elimination of the carrier signal component. The output 20 is graphically represented with the sidebands solid, indicating these signals are present and the carrier signal in broken lines indicating this signal has been eliminated.

Thus a dual loop control leakage elimination circuit has been described in which the outputs of a filter network which are essentially the sidebands of a carrier signal (at low intermediate frequency), are isolated from the carrier signal and the attenuation characteristics of the filter network are employed to control the reduction of frequency of the input signal to such low intermediate frequency level. At the same time the isolated sideband signals from the low intermediate frequency level are reconverted to the frequency value of the original signal, while preserving the information containing characteristics of the sidebands.

It will be obvious to those skilled in the art that the various components employed in the subject arrangement are readily available components.

Although the present invention has been shown and described in its preferred form, obviously other arrangements may be provided, as will be familiar to those skilled in the art, without departing from the spirit of the invention as defined in the appended claims.

What is claimed is:

1. A circuit for eliminating the carrier signal component of a continuous wave multifrequency signal having a carrier signal component and a plurality of sideband signal components including, a balanced mixer, means for applying the carrier signal component and the sideband components as a complex signal to said mixer, a local oscillator for generating a signal the frequency of which may be varied in accordance with the value of a control signal, means for applying said generated signal to said mixer, said mixer having an output signal the frequency of which is the difference of the complex signal and the local oscillator signal and having characteristics of the said complex signal, means for filtering the output signal of the mixer and for separating said output signal into a first signal and a second signal, the lowest frequency of said second signal being higher than the highest frequency of said first signal, whereby the signal component between said first and second signals corresponds to said carrier signal component, means for detecting the bandwith and frequency level between the highest frequency of said first signal and the lowest frequency of said second signal and for providing a control signal, the value of which is representative of said bandwidth and frequency level so detected, means for applying said control signal to said local oscillator, means for summing said first signal and said second signal and for providing an output corresponding to such summed signals, means for amplifying the last mentioned output, a second balanced mixer, means for applying said last mentioned ouput to said second balanced mixer, and means for applying the signal generated by said local oscillator to said second balanced mixer whereby said second balanced mixer provides an output duplicating the said sideband signal components of the said complex signal.

2. A circuit as in claim 1 and in which said means for filtering includes, a first filter having low bandpass characteristics, the highest frequency of which is a predetermined frequency, and a second filter having high bandpass characteristics, the lowest frequency of which is a predetermined frequency but higher than the highest frequency of said first filter.

3. A circuit as in claim 1 and in which said means for filtering includes, a first filter having low bandpass characteristics for passing frequencies below a first predetermined frequency and for attenuating frequencies above said first predetermined frequency, a second filter having high bandpass characteristics for passing frequencies above a second predetermined frequency and for attenuating frequencies below said second predetermined frequency, and said first predetermined frequency being lower than said second predetermined frequency.

4. A circuit as in claim 1 and in which said means for filtering includes, a first filter having low bandpass characteristics, the highest frequency of which is a first predetermined frequency, a second filter having high bandpass characteristics, the lowest frequency of which is a second predetermined higher than the highest frequency of said first filter so that a notch exists between the bandpass characteristics of said first filter and said second filter, and first predetermined frequency being lower than said carrier frequency component and said second predetermined frequency being higher than said carrier frequency component.

5. A circuit as in claim 1 and in which said means for filtering includes, a first filter having low bandpass characteristics, the highest frequency of which is a predetermined frequency and a second filter having high bandpass characteristics, the lowest of which is a predetermined frequency but higher than the highest frequency of said first filter, and said detecting means is a discriminator circuit.

6. A circuit for eliminating a predetermined frequency signal component of a multifrequency signal including, means for generating a predeterminable second frequency signal, means for mixing the multifrequency signal with said predeterminable second frequency signal for providing a second multifrequency signal having characteristics identical to the first mentioned multifrequency signal but at a lower frequency level than said first mentioned multifrequency signal, as an output, a first filter having low bandpass characteristics, the highest frequency of which is a predetermined frequency, a second filter having high bandpass characteristics, the lowest frequency of which is a predetermined frequency but higher than the highest frequency of said first filter so that a notch exists between the bandpass characteristics of said first filter bandpass and said second filter bandpass, means for coupling said first and second filter to said output, means for detecting the frequency characteristics of said notch and for providing a control signal representative of the frequency characteristics so detected, means for coupling said control signal to said generating means for varying the frequency of said second frequency signal in accordance with the value of said control signal, means for summing the output of said first filter and said second filter, means for amplifying the output of said summing means, means for mixing said amplified summed signal and said second predetermined frequency signal for providing an output signal at the frequency of said multifrequency signal without the said predetermined frequency signal component.

7. A circuit as in claim 6 and in which said first filter has a sharp attenuating characteristic at the highest frequency of its bandpass, said second filter having a sharp attenuating characteristic at the lowest frequency of its bandpass, and said notch between said first filter and said second filter being sufficiently wide to attenuate the signal component of the said second multifrequency signal which corresponds to said predetermined frequency signal component of the first mentioned multifrequency signal.

No references cited.

DAVID J. GALVIN, *Primary Examiner.*

J. JORDAN, *Assistant Examiner.*